United States Patent

[11] 3,614,373

| [72] | Inventor | Edwin E. Skilling<br>1481 Third Ave., Chula Vista, Calif. 92011 |
|---|---|---|
| [21] | Appl. No. | 798,701 |
| [22] | Filed | Feb. 12, 1969 |
| [45] | Patented | Oct. 19, 1971 |

[54] METHOD AND APPARATUS FOR ELECTRICALLY DEPOSITING METAL
10 Claims, 4 Drawing Figs.

[52] U.S. Cl. ..................................... 219/69 V, 219/69 C
[51] Int. Cl. ..................................... B23k 9/16
[50] Field of Search ........................... 219/69, 76; 339/12

[56] References Cited
UNITED STATES PATENTS

| 3,048,807 | 8/1962 | Robinson | 339/12 |
| 3,415,970 | 12/1968 | Cline | 219/76 |
| 3,524,956 | 8/1970 | Rocklin | 219/76 |

Primary Examiner—J. V. Truhe
Assistant Examiner—Gale R. Peterson
Attorney—Carl R. Brown ABSTRACT: Method and apparatus for electrically depositing metal from an electrode into the surface of the base member by a hand held unit, which unit continuously vibrates the electrode into indentation contact with the base member surface and with a continuous spark discharge of electrical power having a relatively high voltage and a relatively low current, which electrical power to the unit is automatically turned off after a given interval following separation of the electrode and the base member and is automatically turned on by placing the electrode within spark discharge distance of the base member.

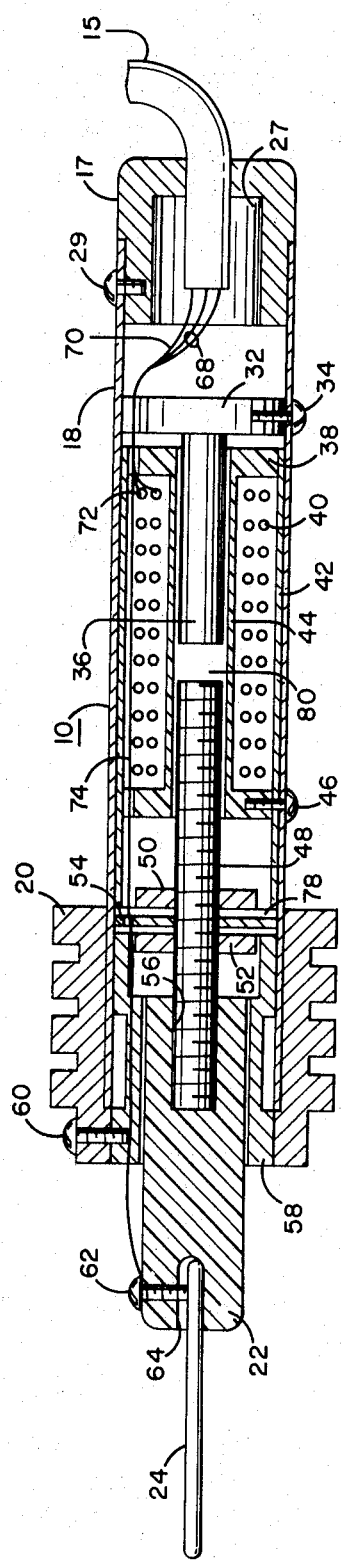
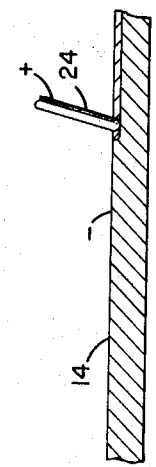
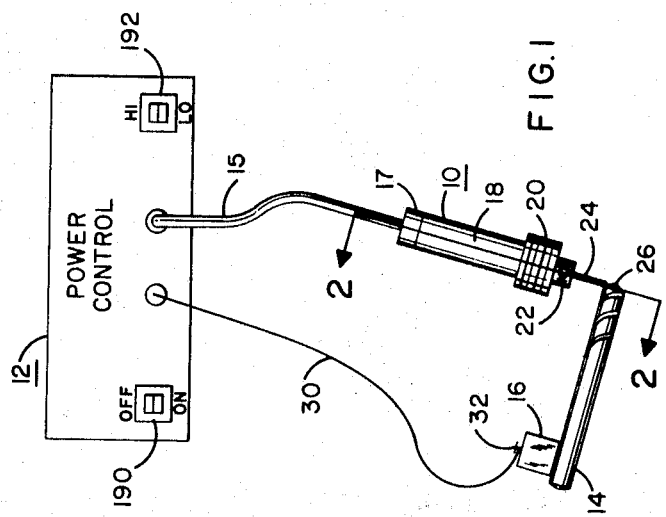

INVENTOR.
EDWIN E. SKILLING

METHOD AND APPARATUS FOR ELECTRICALLY DEPOSITING METAL

BACKGROUND OF THE INVENTION

There are several known devices for depositing metal, such as a carbide metal, onto the surface of a base member, such as the cutting edge of a tool. These known devices employ vibrating electrodes that create an arc between the electrode and the surface of the base member that heats the electrode and deposits the electrode metal onto the surface of the base member. However, such known devices have been found to have several disadvantages. For example, the known devices normally require a relatively large power with large amperage, that is often supplied to a hand held unit and is connected across the electrode and the workpiece. This high amperage creates a carbide surface on the base member that is very rough. Thus after the tip of a drill has been surfaced with carbide from these known devices, the tip must be reworked to provide a sufficiently smooth surface for further use of the tool as a drill. Also the voltage supplied to the device holding the electrode is relatively high, often in the order of 110 volts, which creates an electrical hazard. In an attempt to reduce the effects of this hazard and to reduce the heating of the power supply, such known devices often employ a foot pedal to connect and disconnect line voltage to the power supply. While this allows the operator to interrupt the voltage to the electrode holding unit without requiring the use of the hands, which are normally occupied in holding the electrode unit and the tool that is being tipped, it restricts the operator to a given locality and requires a conscious act to disconnect the line voltage. Because of the inconvenience of the foot operated switching pedal, it has been found that the power supply in such units is often left on continuously for rather long periods of time. This not only causes a dangerous conditions, but overheats the power supply causing large consumptions of power and a serious reduction in the life of the power supply.

Thus it is advantageous to have a new and improved method and apparatus for electrically depositing metal from an electrode into the surface of a base member in which the voltage and power to a hand held unit that holds the electrode are relatively low. Further the power to the hand held electrode unit is automatically interrupted when the electrode is not placed in electrical contact with the workpiece for a given short period of time and is automatically reconnected when the electrode again contacts the workpiece, thus eliminating the need for foot pedals and the like and also reducing electrical hazards and the overheating of the power supply.

SUMMARY OF THE INVENTION

In an exemplary embodiment of this invention, a hand held unit supports an electrode, such as a tungsten carbide electrode, for hand manipulation to contact and deposit metal from the electrode to the surface of a base member. The electrode is electrically connected to a power supply and the return to the power supply is connected in a unique manner through a return conductor that is secured by a magnetic conductor to the metal base member. A coil within the handle device vibrates the electrode with sufficient force to provide continuous indentation contact with the base member surface. An electrical circuit, that may be connected to a normal commercial 115-volt power supply, supplies power through a transformer arrangement at a relatively low voltage to a capacitor bank. The capacitor bank multiplies the voltage and discharges the stored charge across the circuit of the electrode and base member. The vibrating contact of the electrode against the workpiece causes a continuous make and break circuit and thus a continuous charging and discharging of the capacitors creating a substantially continuous arc that heats and deposits the carbide alloy into the surface of the tool steel of the base member. A second transformer supplies power to the coil for vibrating the electrode in the handle member. A second capacitor is connected in series with a control transformer circuit, which series circuit is in parallel with the make and break circuit of the electrode and base member.

A relay circuit controls a relay contact connecting the two previously described transformers to the commercial power supply. The relay circuit employs a unidirectional device, such as an SCR circuit, that conducts to hold the relay in the energized condition. The unidirectional device is self-deenergizing through its gate circuit. However, the previously described control transformer energizes a switching circuit that continuously short circuits the gate circuit of the unidirectional device allowing it to remain energized and conducting. However, should the make and break circuit cease, such as by separating the electrode from the base member, then the unidirectional device in the relay circuit is deenergized opening the power supply contact. The unidirectional device is immediately reenergized upon the electrode contacting the workpiece.

It is therefore an object of this invention to provide a new and improved method and apparatus for electrically depositing metal from an electrode into the surface of a base member.

It is another object of this invention to provide a new and improved method and apparatus for electrically depositing metal from an electrode into the surface of a base member wherein the electrical power to the apparatus is automatically interrupted when the electrode is moved from electrical contact with the base member for a given period of time.

It is another object of this invention to provide a new and improved method and apparatus for electrically depositing metal from an electrode into the surface of a base member that employs a relatively high voltage and a relatively low current in the circuit across the electrode and the base member.

It is another object of this invention to provide a new and improved method and apparatus for electrically depositing metal from an electrode into the surface of a base member wherein the electrical circuit is automatically energized and deenergized by merely contacting the base member with the electrode.

Other objects and many advantages of this invention will become more apparent upon a reading of the following detailed description and an examination of the drawings wherein like reference numerals designate like parts throughout and in which:

FIG. 1 is a view of the metal depositor apparatus of this invention tipping the end of a drill.

FIG. 2 is a cross-sectional view taken along lines 2–2 of FIG. 1.

FIG. 4 is a partial cross-sectional view with parts broken away of the contact of the electrode with the base member.

Figure 3:
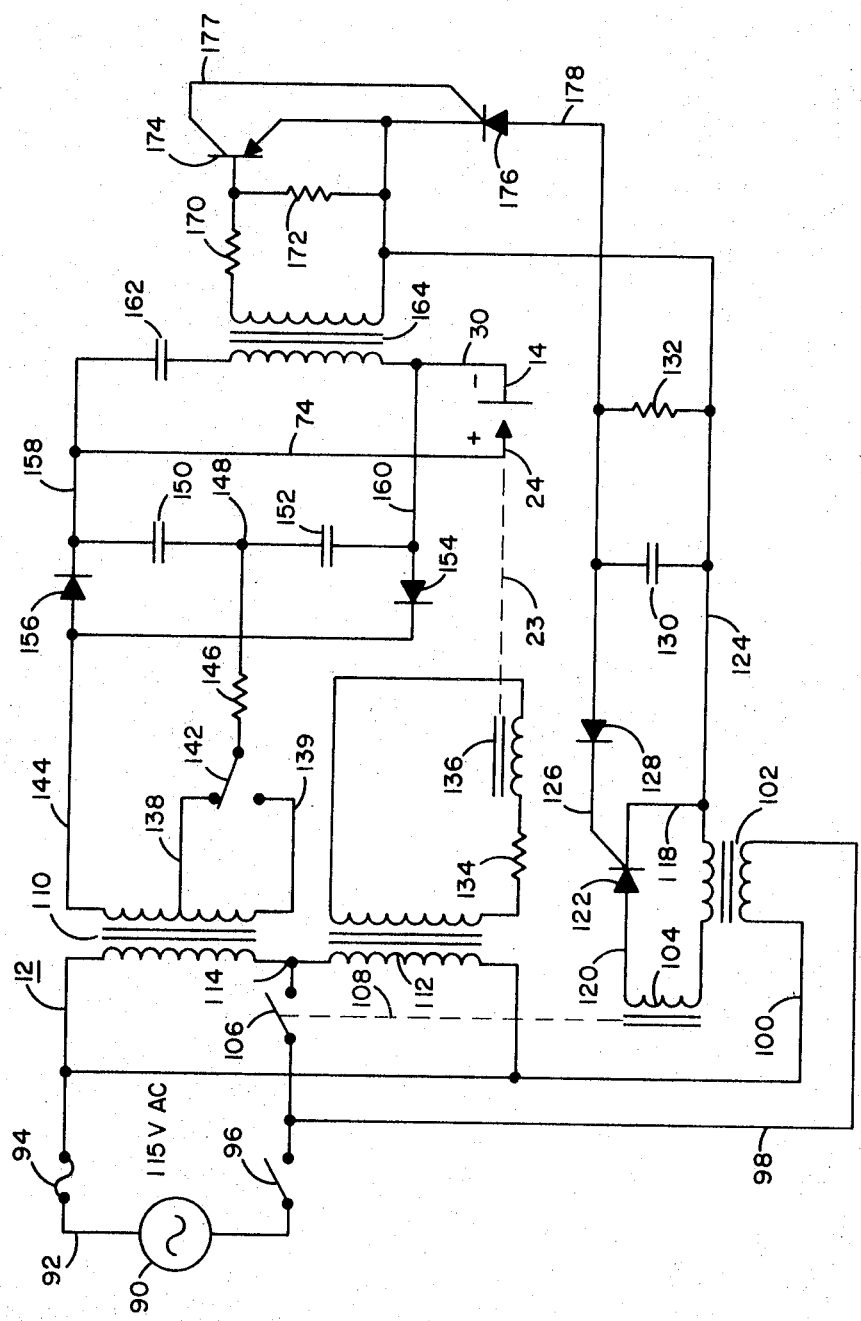
FIG. 3 is a schematic diagram of the electrical power circuit.

Referring to FIG. 1, the electrical metal depositor apparatus comprises a hand held unit 10 having an outer covering or handle 18 with a hand grip 20. An electrode 24, that may be a tungsten carbide rod, is in the position of tipping the end 26 of a drill 14 that is made of tool steel. Electrical power is supplied through line 15 from a power control circuit 12. The return conductor line 30 is connected through magnet 16 to the drill 14. Screw 32 secures the return line 30 to the magnet 16. Thus an easily attachable return circuit is provided. Switch 190 turns the power control circuit on and off and switch 192 selects the power level to electrode 24 between high and low settings.

Referring to FIG. 2, hand held and operated unit 10 has an outer cylindrical shell 18 that may be made of steel. Aluminum, or other suitable materials. Secured at one end by screw 29 is a cylindrical end member 17 that is also made of aluminum or other suitable material. The end member 17 has an opening 27 that receives the input power cable 15. A metal sleeve 42 is positioned within the cylindrical member 18 and encloses a plastic spool 38, with the three members being held in position by screw 46. A coil 40 is wound on the insulating spool 38 and a metal core 36 is inserted into the inner volume of wall 44. The core member 36 has a substantially cylindrical end portion 32 that is secured by screw 34 to the outer sleeve 18. The core 36 is made of any suitable material, such as iron. Also positioned in the cylindrical opening in the spool 38 is a stud member 48 that is spaced from the core member 36 by a space 80 and threads into a thread opening 56 in the electrode holder 22. Electrode holder 22 is made of insulating material, such as plastic or other suitable materials, and is slidably held in the inner cylindrical surface of bushing 58. Bushing 58 is press fit into the outer handle portion 20 and is held therein by screw 60. The outer handle portion 20 fits outside and against sleeve 18 and has a grooved outer surface that permits easier gripping by the user. The cylindrical bushing extends longitudinally to a point immediately adjacent the end of the sleeve 42 providing a space 78 therebetween. Spring washer 54 encircles and slides on stud 48 between the threaded nuts 50 and 52. The outer circumference of the spring washer 54 moves in the circumferential slot 78 and allows the stud 48 between the threaded nuts 50 and 52. The outer circumference of the spring washer 54 moves in the circumferential slot 78 and allows the stud 48 and electrode holder 22 to be moved in a vibrating motion.

The electrode 24 is held in space 64 by set screw 62. A DC line 70 that extends from cable 15 through openings in the depositor structure, is electrically connected by set screw 62 to the electrode 24. The AC lines 68 are connected at 72 to respective windings of the coils 40. Thus DC potential is supplied to the electrode 24, which electrode is moved in a longitudinal vibration movement by the AC energized coil 40.

The electrical power circuit, see FIG. 3, receives power from a known power source 90, such as a 115-volt AC commercial power supply. Switch 96 is the on-off switch 90 of FIG. 1. Upon closing switch 96, AC power is supplied through line 98, transformer winding 102, line 100, fuse 94 and return line 92. Transformer 102 provides power through relay winding 104, line 120, energized SCR 122 and line 118. This energizes relay 108, closing contact 106 and feeding power to point 114 through transformers 110 and 112 to return line 92. Transformer 110 is a step down transformer that reduces the voltage to lines 144 and 139 to approximately 25 volts. Switch 142 switches between pickoff line 138 and line 139 to provide the high- and low-voltage setting of switch 192 in FIG. 1. The power through transformer 110 is fed through rectifying diodes 154 and 156 across capacitors 150 and 152 and through return line 148 and current limiting resistor 146. Since capacitors 150 and 152 are connected in series, the stored charges are added, doubling the voltage across lines 158 and 74 and lines 160 and 30. Electrodes 14 and 24 are the electrode 24 and the base member or drill 14 illustrated in FIG. 1.

It may be understood at this point that when electrode 24 contacts the workpiece or drill 14, the charge across the capacitors 150 and 152 is short circuited causing an electrical discharge to occur through the gap. The AC potential supplied through transformer 112 and through the coil 136 and current limiting resistor 134, vibrates the electrode holder 22 and the electrode 24 in the longitudinal direction of dotted line 23. This vibration movement, which is in the order of 6,000 to 7,000 Hertz, causes a continuous make and break contact between electrode 24 and workpiece 14 that opens and closes the discharge circuit creating a continuous arcing condition.

The voltage through transformer 112 is approximately 6 volts, thus the AC potential to the hand held unit 10 is very low. While the DC potential across the capacitors 150 and 152 is relatively high, the amperage is held low by the storage capacity of capacitors 150 and 152. Thus the discharge power across the electrodes 14 and 24 has a relatively high voltage and a relatively low amperage. This reduces the danger to users of the equipment and it has also been determined, as will be described in more detail hereinafter, to provide an improved, smooth depositing of the electrode metal onto the work piece. Simultaneously with the charging and discharging of capacitors 150 and 152, capacitor 162 is also charging and discharging. The potential across lines 30 and 74 resulting from capacitor 162 in addition to capacitors 150 and 152, is in the order of 70 volts DC in the high range. Moving contact 142 to pickoff wire 138 decreased this voltage to about 45 volts.

In the normal energized condition, the SCR device 122 will continuously draw a negative potential in gate circuit 126 with diode 128 that charges capacitor 130 through resistor 132. When the charge in capacitor 130 reaches a sufficient voltage, then it shuts off SCR 122 and opens the relay circuit opening contact 106 and shuts off line voltage to the power circuits and thus to transformers 110 and 112. This time interval is set by capacitor 130 and resistor 132 and may be in the order of 30 seconds.

As capacitor 162 is charged and discharged, it provides an alternating type current through transformer 164 that supplies a voltage in the order of 2 volts across resistors 170 and 172, which turns on transistor 174 shorting the gate circuit 177 of SCR 176. This inturn energizes SCR 176 and closes the circuit through lines 124 and 178 across the timing capacitor 130, discharging the negative charge. Accordingly at any time when the on switch 96 is closed, the make or break circuit of electrodes 14 and 24 must be closed within a given period of time, or the SCR circuit 122 will be timed-out and will open the relay circuit 104, opening switch contact 106. To reenergize the control circuit, it is merely necessary to again close the circuit through electrode 24 and the workpiece 14. This discharges capacitor 162, which charge creates flux in transformer 164 that energizes transistor 174 and SCR 176. In the manner previously described relay contact 106 is closed and the power is again connected to the electrode circuit and the vibrating circuit. Thus this control circuit automatically deenergizes the power circuit when the equipment is energized but is not being immediately used.

In operation, the electrical metal depositor of this invention may be used to quickly and easily deposit a metal coating, as for example a hard surface such as a tungsten carbide surface, to a base member, such as the end of a drill, in a quick, safe and easily applied manner to provide a relatively smooth surface. The power involved is relatively low as is the amperage, thus the equipment can be more safely handled. The workpiece is connected by magnet 16 to the return line 30. By turning on the power switch 190, power from the control circuit of FIG. 3 supplies power to the electrode 24 while at the same time the electrode 24 is vibrated longitudinally. The hand unit is then manipulated to place the electrode 24 in contact with the surface 26 to be plated. As illustrated in FIG. 4, electrode 24 is driven into the surface of the base member 26 and at the same time the electrical potential is discharged in an arc. This combination of the heat of the arc and the tip of the electrode 24 being forced into the metal 14, removes portions of the electrode metal, which is deposited into the surface of the base metal 14 in the form of a hard tungsten carbide surface.

In this operation, referring to FIG. 3, the switch 96 is closed to energize relay 104 that closes switch 106. Switch 142 has been set to the appropriate voltage level between high- and low-voltage settings. The potential then builds up across capacitors, 150, 152 and 162 and is discharged by the make or break contact of the electrode 14 and work piece 24. This discharges capacitor 162 that energizes transistor 174 and SCR 176, closing the short circuit across the gate circuit 126 of SCR 122 that removes the charge on capacitor 130. This holds the circuit in operation as long as the electrode 124 is placed in depositing contact with the base member 14. When it is removed for any given period of time that is sufficient to time out the charging of capacitor 130, then the circuit is deenergized. This provides control of the potential to the electrode unit in the hands of the user or operator without requiring foot control mechanisms or the like.

It may thus be seen that there is provided a simple, light weight, efficient and relatively inexpensive electrical metal depositor for depositing hardened carbide surfaces on drill tips or other base members in a quick, efficient, and simplified manner, that is safely performed and which provides an improved surface that is sufficiently smooth that the surface does not normally have to be reworked before the drill may be used in its normal drilling functions.

Having described my invention, I now claim:

1. An apparatus for depositing material from an electrode onto the surface of another conductor member comprising, means for holding an electrode in close proximity to a conductor member, electrically operated means for vibrating the electrode in the holding means causing a substantially continuous make and break contact between the electrode and the conductor member, means for supplying electrical power to the vibrating means and across the electrode and the conductor member, and circuit means for electrically disconnecting the electrical power supplying means to the vibrating means and the electrode responsive to the electrode not contacting the conductor member for a predetermined period of time in excess of the period of time between said make and break contact caused by said means for vibrating said electrode.

2. An apparatus as claimed in claim 1 in which, the circuit means is made operable responsive to the electrode contacting the conductor member to electrically connect the electrical power supplying means to the vibrating means and to the electrode.

3. An apparatus as claimed in claim 1 in which, the circuit means holds the electrical power supplying means in electrical connection to the vibrating means and to the electrode during the period of time that the electrode is in vibrating contact with the conductor member.

4. An apparatus as claimed in claim 1 including, said means for supplying electrical power includes a conductor magnet connected to a return conductor for adhering to and electrically connecting the conductor member to the means for supplying electrical power.

5. An apparatus as claimed in claim 1 in which, said circuit means for electrically disconnecting the electrical power supplying means includes a relay controlled contact that opens the supplying electrical power means, a relay circuit for energizing said relay to move said contact, and means in the circuit means responsive to the continuous occurrence of the make and break contact for holding said relay energized.

6. An apparatus as claimed in claim 1 in which, the supplying electrical power means includes first transformer means for supplying a voltage to storage capacitor means that are connected across the electrode and conductor member, second transformer means having a first winding connected in series with at least a part of the storage capacitor means, and the circuit means is responsive to voltage changes in the second winding of the second transformer means for disconnecting the electrical power supplying means.

7. An apparatus as claimed in claim 6 in which, the circuit means includes a relay controlled contact that opens the circuit including said first transformer means, a relay circuit including a unidirectional device in series that energizes the relay that controls the relay contact, and means for biasing said unidirectional device to a nonconducting condition upon a given time period after the voltage changes in the second winding ceases.

8. The method of electrically depositing metal from an electrode into the surface of a base member comprising the steps of, vibrating the electrode to punch into the surface of the base member causing a substantially continuous spark discharge between the electrode and the base member, supplying electrical power through a power supply to the electrode and workpiece, and automatically interrupting electrical power to the power supply within a given time interval in response to separation of the electrode from the base member.

9. The method as claimed in claim 8 including the step of, automatically reconnecting electrical power to the power supply by placing the electrode sufficiently close to the workpiece to cause an arc discharge.

10. The method as claimed in claim 9 wherein, the voltage of said power supply is at least 45 volts.